(12) United States Patent
Salesse-Lavergne

(10) Patent No.: US 6,793,173 B2
(45) Date of Patent: Sep. 21, 2004

(54) AUTOMATIC CONTROL DEVICE FOR A HELICOPTER AND AUTOMATIC CONTROL SYSTEM COMPRISING SUCH A DEVICE

(75) Inventor: Marc Salesse-Lavergne, Marseille (FR)

(73) Assignee: Eurocopter, Marignane (FR)

( * ) Notice: Subject to any disclaimer, the term of this patent is extended or adjusted under 35 U.S.C. 154(b) by 0 days.

(21) Appl. No.: 10/264,256

(22) Filed: Oct. 4, 2002

(65) Prior Publication Data

US 2003/0066927 A1 Apr. 10, 2003

(30) Foreign Application Priority Data

Oct. 5, 2001 (FR) .............................. 01 12827

(51) Int. Cl.$^7$ ................................ B64D 19/00
(52) U.S. Cl. ................................ 244/17.13; 244/194
(58) Field of Search .......................... 244/17.13, 175, 244/177, 178, 180, 182, 191, 194, 195; 701/3, 4, 8

(56) References Cited

U.S. PATENT DOCUMENTS

| | | | |
|---|---|---|---|
| 3,927,306 A | * 12/1975 | Miller | |
| 4,029,271 A | 6/1977 | Murphy et al. | |
| 4,168,045 A | * 9/1979 | Wright et al. | |
| 4,304,375 A | * 12/1981 | Builta et al. | |
| 4,551,804 A | * 11/1985 | Clark et al. | |
| 4,564,908 A | * 1/1986 | Clelford et al. | |
| 4,628,455 A | * 12/1986 | Skutecki | |
| 5,141,177 A | * 8/1992 | Wright et al. | |
| 5,238,203 A | * 8/1993 | Skonieczny et al. | |
| 5,428,543 A | * 6/1995 | Gold et al. | |
| 5,676,334 A | * 10/1997 | Cotton et al. | |
| 5,730,394 A | 3/1998 | Cotton et al. | |

\* cited by examiner

*Primary Examiner*—Tien Dinh
(74) *Attorney, Agent, or Firm*—Stevens, Davis, Miller & Mosher, LLP

(57) ABSTRACT

A device for the automatic control of a helicopter may include two objective algorithms associated with the collective axis, each of these algorithms automatically determining a command for operating the collective pitch of the blades of the main rotor of the helicopter. The device may also include two objective algorithms associated with pitching axis that function simultaneously and automatically determine a command for operating the tilting of the disk of the main rotor. A first selection device automatically selects the objective algorithm whose command is used for the collective axis, and a second selection made by the first selection device, the objective algorithm whose command is used for the pitching axis.

9 Claims, 4 Drawing Sheets

AUTOMATIC CONTROL DEVICE FOR A HELICOPTER AND AUTOMATIC CONTROL SYSTEM COMPRISING SUCH A DEVICE

BACKGROUND OF THE INVENTION

The present invention relates to an automatic control device for a helicopter, as well as to an automatic control system comprising such an automatic control device.

DESCRIPTION OF THE PRIOR ART

It is known that an automatic control system for a helicopter generally comprises:

- a set of sensors for automatically determining the effective values of state parameters of the helicopter;
- means of adjustment allowing an operator of the helicopter to choose preset values of state parameters;
- a set of actuators which act on control axes of the helicopter, according to control commands; and
- an automatic control device which automatically determines control commands for said actuators, as a function of the state parameters and of the preset values, received respectively from said sensors and from said means of adjustment.

The job of the automatic control system is to aid, or even to completely replace, the pilot in the flying of the helicopter. For this purpose, it is capable of slaving one or more state parameters of the helicopter, such as the altitude, the attitude or the speed for example, to one or more preset values chosen beforehand by the pilot. The automatic control system acts for this purpose on one of the control axes (roll axis, pitch axis, yaw axis and collective axis) so as to command the corresponding state parameter or parameters.

It will be noted that both the pitching axis and the collective axis make it possible to control the airspeed (which corresponds, according to the invention, to the speed of the helicopter with respect to the air) or parameters of the vertical plane. It will moreover be noted that the collective axis makes it possible to act on the pitch of the blades (as would the pilot by shifting the collective control stick) in such a way as to apply the same variations in angle of incidence to each of the various blades of the main forward motion and lift rotor of the helicopter. This results in a shift of the helicopter along a vertical axis (upward/downward).

Additionally, the two axes relating to the cyclic pitches (pitching axis and roll axis) produce a cyclic variation of the angle of incidence of the blades of the main rotor, these blades then having angles of incidence which vary as a function of their azimuth. This results in a forward tilting of the rotor (pitching) or sideways tilting (roll) or a combination of these two movements.

The automatic control system comprises various independent modes of slaving. Several of these modes may even be activated simultaneously. These modes are activated with the aim of carrying out a flight without intervention from the human pilot or pilots on the flight controls. Generally, an automatic control system is capable:

- of acquiring and of maintaining a specified airspeed, that is to say a specified speed of the helicopter with respect to the air;
- as well as of continuing an objective, in the vertical plane (acquisition and maintaining of a barometric altitude, of a vertical speed, of an approach slope or of a "radioprobe height" for example);
- whilst ensuring, in a horizontal plane, the following of a flight plan (alignment with a given heading, with guidance beacons, with let-down axes, etc.) and generally, steering along a trajectory.

Such a system for the automatic control of a helicopter which enables the pilot to free himself completely of the task of controlling the helicopter, for almost the entire flight, may exhibit safety problems, generally having two different types of origin:

- a mechanical origin due to a malfunctioning of the set of sensors, computers and actuators forming part of the automatic control system; and
- a human origin due to a lack of attention or to a lack of knowledge of the automatic control system and of its limitations on the part of a pilot or of a crew member of the helicopter.

For this purpose, it is known that the more the flight management is automated, the more the control task is eased, and the less inclined is the crew to monitor the proper operation of the control system and the consistency of the modes and presets which it itself has displayed. The automatic control system must therefore to a large extent ensure its own monitoring and introduce automatic protections or limitations to cover the risks of ill-use. Such monitoring and protection means are numerous in helicopter automatic control systems. The following will be cited by way of illustration:

- a dual architecture of the control loop (sensor, computer, actuator) allowing multiple monitoring;
- multiple alarms and signalings presented to the crew, allowing diagnosis of the state of the control system possibly calling for increased monitoring (indication of disparities between sensors, of loss of redundancy, of abnormal alteration or of excessive discrepancy in the event of deviation from the preset displayed, etc.), or even active participation (need for the pilot to regain manual control of the helicopter, etc.); and
- flight domain protection elements, such as the limiting of commands heading for the collective axis so as not to exceed the maximum permitted power or automatic leveling-off at the end of an instrument approach using a set of beacons on the ground and of receivers on board the helicopter.

However, all these monitoring and protection means participate in essence in the safety of the functioning of the technical control loop, but do not directly reduce the risks related to the human factor, since the pilot still intervenes in the complete control loop (action on the controls, on the presets, on the selection of modes, etc.).

More especially, it is known that a standard automatic control device comprises:

- a single objective law for the pitching axis, namely a forward motion objective law whose aim is to maintain the airspeed with respect to a preset value. To do this, said objective law for the pitching axis determines, automatically, a control command for operating the tilting of the disk of the main rotor of the helicopter. It will be noted that, within the framework of the present invention, an objective law is a means of calculation which determines a particular control command making it possible to bring or to bring back at least one state parameter of the helicopter to an objective (which represents a preset value of this state parameter or of another state parameter); and
- two objective laws for the collective axis, namely a vertical objective law and a law of maintaining the recommended power. Each of these two laws determines, automatically, a control command for operating the collective pitch of the blades of the main rotor of the helicopter.

With such an automatic control device, during normal functioning of the helicopter, the acquisition and holding of the airspeed are achieved via the pitching axis (forward motion objective law) and that of the parameter of the vertical mode (for example the altitude) via the collective axis.

However, as soon as the available power becomes insufficient to maintain the airspeed (that is to say the speed of the helicopter with respect to the air) at the scheduled preset value, the vertical objective law of the collective axis hits a top limitation which is calculated by the law for maintaining the power (the object of which is to maintain the power at a recommended value). In this case, the automatic control device still ensures safety in terms of power (maintaining of the power required for the flight configuration), but more in terms of vertical objective (altitude for example), since the vertical objective is no longer commanded by this automatic control device. In such a situation, it is the pilot who must intervene to ensure safety in terms of vertical objective. Thus, when he notes the toggling of law to the collective axis and that the helicopter is still descending, the pilot disengages, manually, the mode for holding the airspeed on the pitching axis so as to release this axis for the achieving of the vertical objective.

This known solution therefore exhibits risks related to the necessary intervention of the pilot who must not only be aware of the situation, but must also react appropriately.

SUMMARY OF THE INVENTION

The object of the present invention is to remedy these drawbacks. It relates to a device for the automatic control of a helicopter exhibiting enhanced safety in fully automatic mode (with no intervention from a pilot), while making it possible to maintain the helicopter within an ever-safe flight envelope.

For this purpose, according to the invention, said automatic control device comprising:

at least one objective law in respect of the pitching axis, the aim of such an objective law being to bring at least one state parameter of the helicopter to an objective which represents a preset value of a state parameter, said objective law in respect of the pitching axis automatically determining for this purpose a control command for operating the tilting of the disk of said main rotor of the helicopter; and at least two objective laws in respect of the collective axis, each of these laws automatically determining a control command for operating the collective pitch of the blades of said main rotor, is noteworthy in that it comprises:

at least two objective laws in respect of the pitching axis, which function simultaneously;

first selection means for automatically selecting the objective law whose control command is used for the collective axis; and second selection means for automatically selecting, as a function of the selection made by said first selection means, the objective law whose control command is used for the pitching axis.

Thus, by virtue of the simultaneous functioning of at least two objective laws relating to the pitching axis and of the use of the information regarding the switching of laws to the collective axis so as to select the appropriate law on the pitching axis, enhanced safety is obtained in automatic mode, making it possible to maintain the helicopter within a safe flight envelope, as will be seen in detail hereinbelow.

Moreover, this automatic switching is in accordance with what a pilot does naturally (and manually) in such a situation.

In a preferred embodiment, said automatic control device comprises at least one vertical objective law and one law for maintaining the recommended power for the collective axis, and at least one forward motion objective law and one vertical objective law for the pitching axis, said first selection means automatically select the vertical objective law during normal functioning of the helicopter and the law for maintaining the recommended power when the power becomes insufficient to maintain the airspeed of the helicopter at a corresponding preset value, and said second selection means automatically select:

the forward motion objective law, when the first selection means select the vertical objective law; and the vertical objective law when the first selection means select the law for maintaining the recommended power.

Thus, by virtue of the invention, when the power of the helicopter is insufficient to maintain the airspeed at its preset value, the vertical objective (altitude, height, vertical speed, vertical acceleration, etc.) is ensured automatically by the pitching axis, whereas the collective axis automatically ensures the maintaining of the power at the recommended value. This is made possible by the simultaneous functioning of at least two objective laws (standard law with forward motion objective and vertical objective law) on the pitching axis and through the use of the information regarding the switch from the vertical objective law to the law for maintaining the recommended power on the collective axis, so as to select on the pitching axis the appropriate law, in this instance the vertical objective law.

This logic (or automatic switching) is in accordance with what a pilot does naturally in fast cruising flight.

Furthermore, advantageously, said automatic control device moreover comprises a law for maintaining the optimal upward speed for the pitching axis, and said second selection means automatically select said law for maintaining the optimal upward speed when the power available is insufficient to maintain the airspeed above an optimal upward speed.

This latter logic is likewise in accordance with what a pilot does naturally. It avoids a drift towards very low airspeeds, with considerable pitching attitudes, and ensures a minimal upward rate, regardless of the presets displayed by an operator (pilot, etc.) of the helicopter.

The aforesaid characteristics are made possible by virtue of the fact that the pitching axis which operates the forward tilting of the disk of the main rotor, makes it possible to control:

either a horizontal objective (airspeed for example) by virtue of the horizontal component of the aerodynamic resultant of the rotor disk (of said main forward motion and lift rotor of the helicopter);

or a vertical objective (vertical speed for example) by virtue of the vertical component of the aerodynamic resultant of said rotor disk.

Additionally, it will be noted that the insufficiency of power which is considered in the present invention, may have as object, in particular, a fault with one of the engines of the helicopter. Specifically, when one of the engines develops a fault, thereby obviously entailing an abrupt reduction in the available power, the automatic control device in accordance with the invention rapidly lowers the collective pitch, by applying its function of automatic limiting of the power to the recommended value, and automatically toggles the vertical objective on the pitching axis, thereby certainly reducing the airspeed, but avoiding any loss of altitude.

By virtue of the invention, no retaking of manual control by the pilot is therefore required during such a fault which is generally very critical since the pilot, who is nevertheless a priori distracted, is supposed to very quickly reduce the pitch, so as to prevent the rotor revolutions from dropping.

Thus, the present invention implements two characteristics specific to the limits of the flight domain, where safety may be threatened, namely:

- a ranking of priorities. In complying with the recommended power, priority is given:
  - to the vertical objective, while the airspeed is greater than the optimal upward speed; and
  - to the airspeed preset, if it is below the optimal upward speed; and
- combined consideration of the pitching axis and of the collective axis as regards the management of these priorities, and not independent use as in the case of a standard automatic control device, in which each control axis obeys just one objective.

Additionally, advantageously, said automatic control device moreover comprises latching means for automatically latching the collective axis to a law for maintaining the recommended power, when it is selected. This makes it possible to prevent oscillatory functioning of the helicopter.

In this case, said automatic control device moreover comprises means for automatically unlatching said latching means, as a function of at least one action of a pilot of the helicopter and/or of control commands which are determined for the pitching axis.

Additionally, it is known that in fast cruising flight, with a standard automatic control device, the airspeed is maintained via the pitching axis and the vertical objective is ensured via the collective axis. In this case, the fluctuations in the vertical plane (altitude, vertical speed, etc.) are therefore compensated for by the collective axis. Since these fluctuations are both very frequent and of fairly large amplitudes during high-speed flight, they make great demands on the collective axis, thereby entailing excess consumption of fuel. To avoid this, in practice, the pilot prefers to manage the power in fast cruising flight himself, but this then prevents him from being able to benefit from the aforesaid safety facilities offered by the automatic control device.

To remedy this drawback, according to the invention, the automatic control device comprises at least one vertical objective law and one stabilization law for the collective axis, at least one forward motion objective law and one vertical objective law for the pitching axis, and means for detecting stabilization of the case of flight (in particular level at substantially constant speed) of the helicopter. In addition, said first selection means automatically select in respect of the collective axis the vertical objective law, during normal functioning of the helicopter, and when said detection means detect stabilization of the case of flight, said stabilization law which determines a control command for maintaining the collective pitch of the blades of the main rotor at a mean value, and said second selection means automatically select:

- the forward motion objective law, when the first selection means select the vertical objective law; and
- the vertical objective law, when the first selection means select the stabilization law.

Furthermore, to counter a loss of speed effect which is contrary to the airspeed preset initially scheduled by the pilot, in particular during a maneuver (turning for example), said stabilization law comprises means for correcting the control command of the collective pitch, with a response time which is greater than a predetermined time, so as to maintain an airspeed objective. Since, according to the invention, this predetermined time is relatively long, the collective pitch is thus corrected gently.

Moreover, the automatic control device in accordance with the invention also comprises means for automatically returning in this case to the selection representative of normal functioning, as a function of at least one action of a pilot of the helicopter and/or of measured values.

The aforesaid logic exhibits two advantages:

- on the one hand, it complies with what the pilot does naturally, it is therefore easy to interpret; and
- on the other hand, the collective axis has only to compensate for the fluctuations in the airspeed (in particular while turning). Now, experience shows that their frequency and their amplitude are much lower than those of the fluctuations in the vertical plane. The aforesaid excess consumptions of fuel are therefore greatly reduced, thus prompting continuous use of the automatic control device throughout the nominal cruising domain, with all the inherent advantages in terms of safety in particular.

The present invention also relates to a system for the automatic control of a helicopter, of the type described above.

According to the invention, this automatic control system is noteworthy in that it comprises the aforesaid automatic control device.

BRIEF DESCRIPTION OF THE DRAWINGS

The figures of the appended drawing will elucidate the manner in which the invention may be embodied. In these figures, identical references designate similar elements.

DESCRIPTION OF THE PREFERRED EMBODIMENTS

Figure 1:
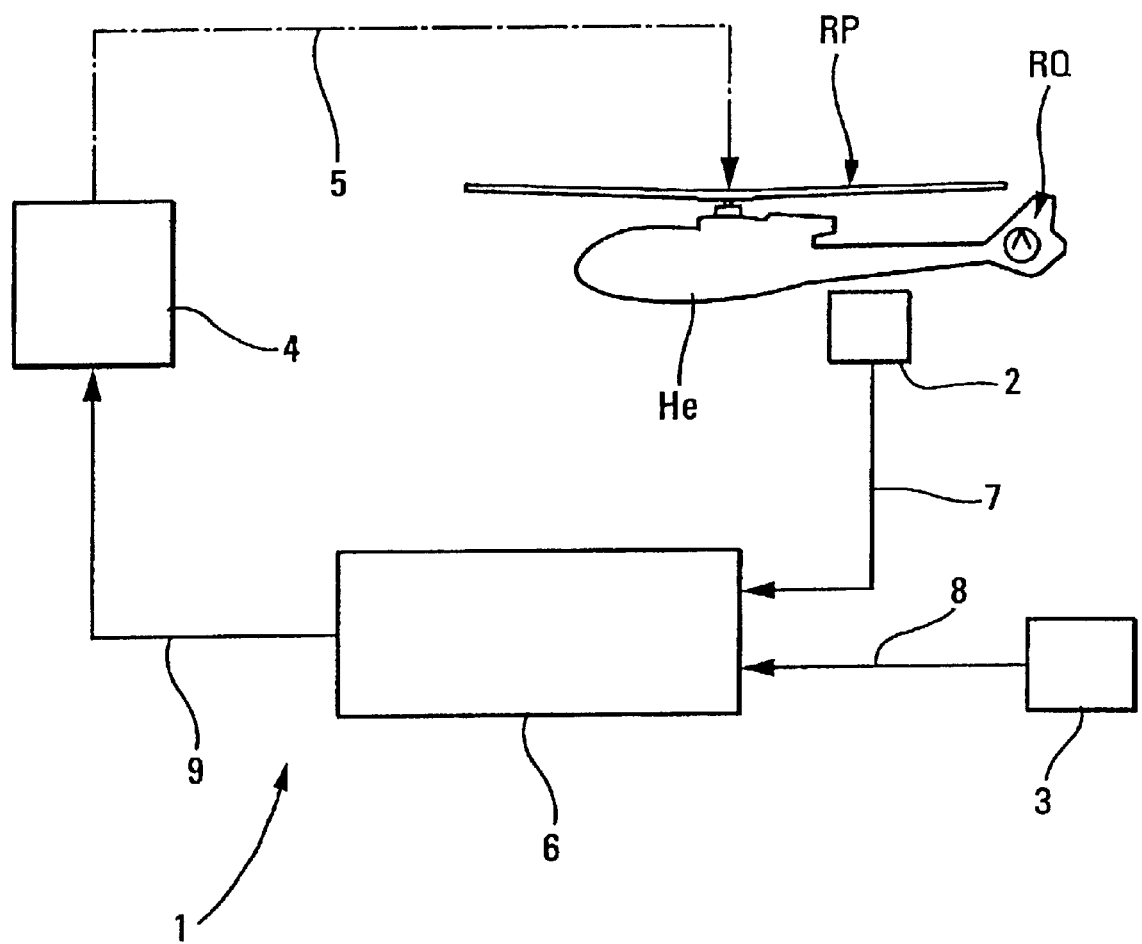
FIG. 1 is the schematic diagram of an automatic control system in accordance with the invention.

The automatic control system 1 in accordance with the invention and represented diagrammatically in FIG. 1 is mounted on board a helicopter He to be automatically controlled, although for reasons of clarity of the drawing, the helicopter He is represented on a small scale, outside said automatic control system 1, in this FIG. 1. In the example represented, the helicopter He comprises a main rotor RP intended for ensuring lift and forward motion, as well as a tail rotor RQ, intended for ensuring balance and yaw-wise control of the helicopter He.

Said automatic control system 1 comprises, in standard fashion:

- a set of standard sensors 2, for automatically determining (in particular measuring) the effective values of state parameters, such as the altitude, the height, the attitude, the acceleration, the speed or the airspeed of the helicopter He, for example;
- standard means of adjustment 3, allowing an operator of the helicopter, in particular a pilot, to choose preset values of state parameters, such as the altitude, the height, the vertical speed, the distance, the airspeed or the acceleration of the helicopter He in particular;

a set of standard actuators 4, which act on control axes of the helicopter He, as illustrated by a broken line 5, according to control commands; and an automatic control device 6 which automatically determines control commands for said actuators 4, as a function of the state parameters and of the preset values received respectively from said set of sensors 2 and from said means of adjustment 3, by way of links 7 and 8, and which automatically transmits these control commands to said actuators 4, by way of a link 9.

According to the invention, said automatic control device 6 acts on the cyclic axes (pitching axis and roll axis), on the yawing axis and on the collective axis of the helicopter He. This is why this is referred to as "four-axis" automatic control. However, only the pitching axis AT and the collective axis AC are considered within the framework of the present invention, so that we shall refer only to these two axes in the following description.

Figure 2:
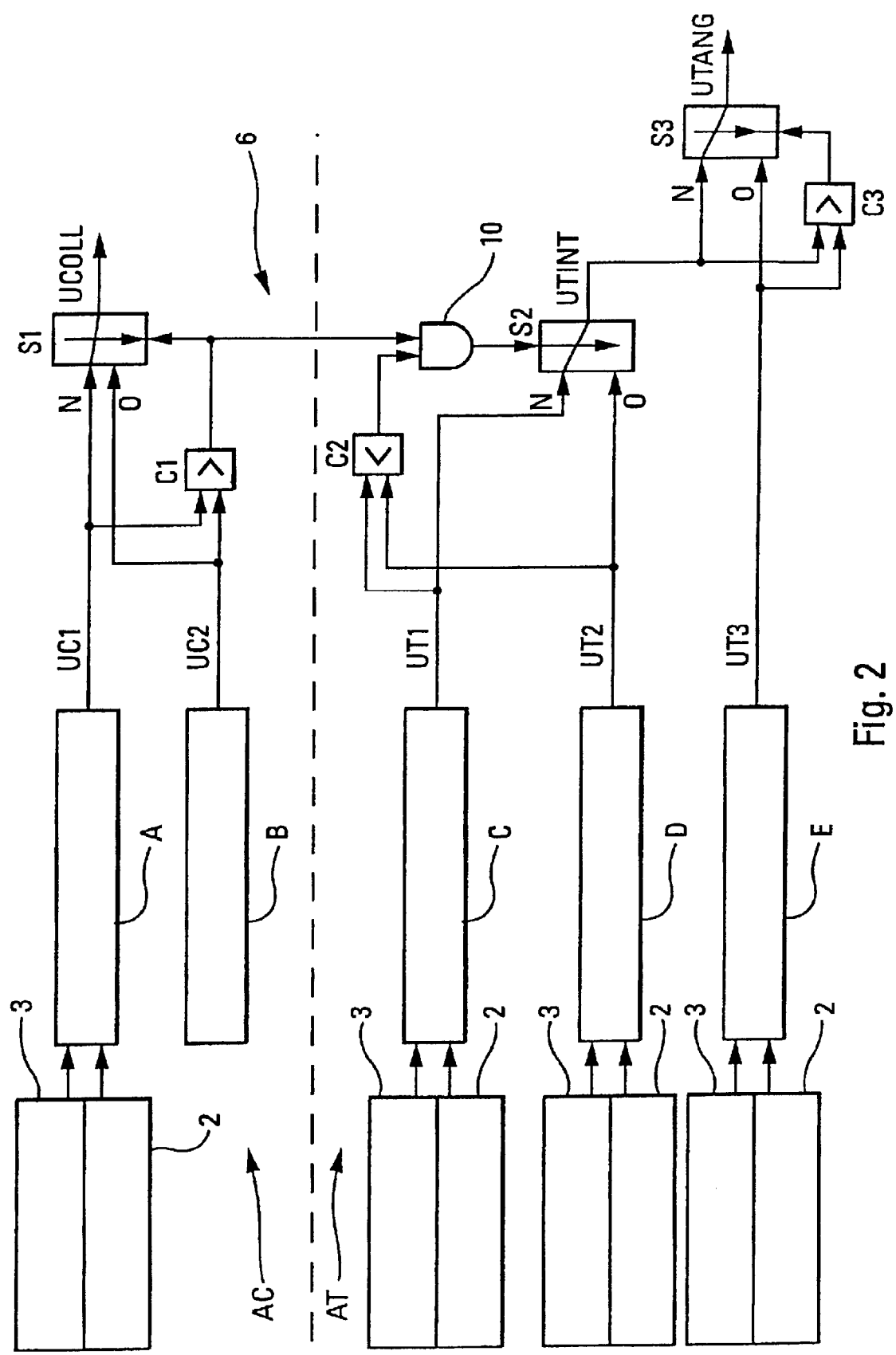
FIG. 2 is the schematic diagram of a basic embodiment of an automatic control device in accordance with the invention.

According to the invention, said automatic control device 6 in accordance with the invention comprises, as represented in FIG. 2:

at least two objective laws A, B in respect of the collective axis AC. Each of these laws A, B automatically determines a control command, UC1 and UC2 respectively, for operating the collective pitch of the blades of the main rotor RP, at least two objective laws C, D, E in respect of the pitching axis AT, which function simultaneously. Each of these objective laws C, D, E automatically determines a control command, UT1, UT2 and UT3 respectively, for operating the tilting of the disk of the main rotor RP of the helicopter He;

selection means C1, S1, specified hereinbelow, for automatically selecting the objective law A, B, whose control command UCOLL is used for the collective axis AC; and selection means C2, S2, 10, C3, S3, specified hereinbelow, for automatically selecting, as a function of the selection made for the collective axis AC the objective law C, D or E whose control command UTANG is used for the pitching axis AT.

Within the framework of the present invention, a law A, B, C, D, E is a means of calculation which determines a control command whose aim is to bring a state parameter which is measured by the set of sensors 2, to a preset value (or objective) which is fixed by the pilot by way of the means of adjustment 3.

By way of illustration it will be noted that:

the preset values may be:
for laws A and D: the altitude, the height, the vertical speed, the vertical acceleration;
for law C: a distance, the airspeed, the acceleration; and
for law E: the optimal upward speed, the zero acceleration; and the state parameters may be:
for laws A and D: the altitude, the height, the vertical speed, the vertical acceleration;
for law C: the speed, the longitudinal acceleration, the attitude, the angular speeds; and
for law E: the airspeed, the longitudinal acceleration, the attitude, the angular accelerations.

In the embodiment of FIG. 2, the automatic control device 6 comprises at least one vertical objective law A and one law B for maintaining the recommended power for the collective axis AC, and at least one law C with forward motion objective and one law D with vertical objective for the pitching axis AT. According to the invention, said first selection means C1, S1 automatically select the vertical objective law A, during normal functioning of the helicopter He, and the law B for maintaining the recommended power, when the available power becomes insufficient to maintain the airspeed (that is to say the speed of the helicopter He with respect to the air) at a corresponding preset value, and said second selection means C2, S2, 10 automatically select:

the law C with forward motion objective, when the first selection means select the vertical objective law A; and the law D with vertical objective, when the first selection means select the law B for maintaining the recommended power.

Moreover, the device 6 also comprises a law E for maintaining the optimal upward speed for the pitching axis AT, and said second selection means C3, S3 automatically select said law E for maintaining the optimal upward speed, when the available power is insufficient to maintain the airspeed above a predetermined optimal upward airspeed.

Thus, on the collective axis AC:

the law A with vertical objective formulates a control command UC1 for increasing or lowering the collective pitch;

at the same time, the law B calculates a control command UC2 for maintaining the power at the maximum permitted level, this limit being calculated as a function of the flight conditions; and a comparator C1 calculates the discrepancy between the two commands UC1 and UC2 such that:
if UC1 is less than UC2, the law A controls the collective pitch (UCOLL=UC1) [by convention, UC>0 signifies command to increase the pitch]; and
if UC1 is greater than UC2, the law B controls the collective pitch (UCOLL=UC2). However, in this case, the pitching axis AT must intervene to control the vertical objective.

It will be noted that UC2 is large when we are far from the power limit since this control command represents the variation in collective pitch which would be necessary to reach the power limit. UC1 is close to zero during stabilized level flight. If the law A formulates an up command:

UC1 increases, since it reflects the up command; and
UC2 decreases, since the power margin decreases.

Consequently, UC1 and UC2 end up crossing one another and UCOLL is the smaller of the two commands.

It will be noted that, within the framework of the present invention, any comparator (such as C1 and C3) which comprises the ">" sign, signifies that, if a value α is brought to the upper input and a value β is brought to the lower input, the output takes the response:

O (yes), if α>β; and
N (no), if α≦β.

On the other hand, any comparator (such as the comparator C2 for example), which comprises a "<" sign, signifies that, if a value γ is brought to the upper input and a value δ is brought to the lower input, the output takes the response:

O (yes), if γ<δ; and
N (no), if γ≧δ.

The letters O and N in FIGS. 2 to 5 correspond to these situations (yes and no).

Furthermore, within the framework of the present invention, any selector such as the selectors S1, S2 and S3 for example, links its output to one of the inputs O (yes) or N (no), as a function of the result of the comparison carried out by the comparator C1, C2, C3 associated therewith.

The law C with forward motion objective (which generally considers the airspeed, but it is also possible to envisage considering a ground speed, a transit time, or a distance associated with a crossing time) might request too high a collective pitch, if too high a forward speed of advance is requested, this being incompatible with the power available. In this case, a toggle must be effected. To do this, the comparator C2 compares the command UT1 emanating from the law C with the command UT2 emanating from the vertical objective law D. It will be noted that the law D is similar to the law A, but with slightly different gains which are adapted to the pitching axis AT. The sign convention used in the present description for the pitch is that UT>0 signifies command to increase the pitch attitude.

If the collective axis AC is controlled by the law B (maintaining of power) and UT1 is less than UT2, UT1 is not selected to control the pitch (so as to avoid continuing the descent), by virtue of the gate 10 which is an AND logic gate and of the selector S2. A control command UTINT is delivered to the output of this selector S2. In this case, the collective axis AC is governed by the law B and the pitch axis AT is governed by the law D (vertical objective law).

If under these conditions the pilot requests an upward speed, UT2 increases, but the airspeed drops, since the power is already at the maximum level. Without intervention, the helicopter He will start hovering again, or even go backward, and then runs the risk of a major incident in flight cases where the pilot has a limited perception of the outside world, such as in instrument flight. This is why the law E is made to intervene so as to maintain the airspeed at a value Vy which is the speed guaranteeing the optimal upward rate (predetermined in a standard manner). This law E for maintaining the value Vy uses the same state parameters as the law C, but its preset values are:

Vy=constant; and zero acceleration.

The control command UT3 calculated by this law E is compared by the comparator C3 with the value UTINT, and it is the greatest nose-down command which is selected in order to preserve the value Vy. Consequently, if UT3<UTINT, then UTANG=UT3.

Thus, by virtue of the invention, several laws (in particular three laws C, D, E in the example of FIG. 1) are made to function simultaneously on the pitching axis AT, and the one which responds best to the priority scheduled at the relevant moment is selected.

Figure 3:
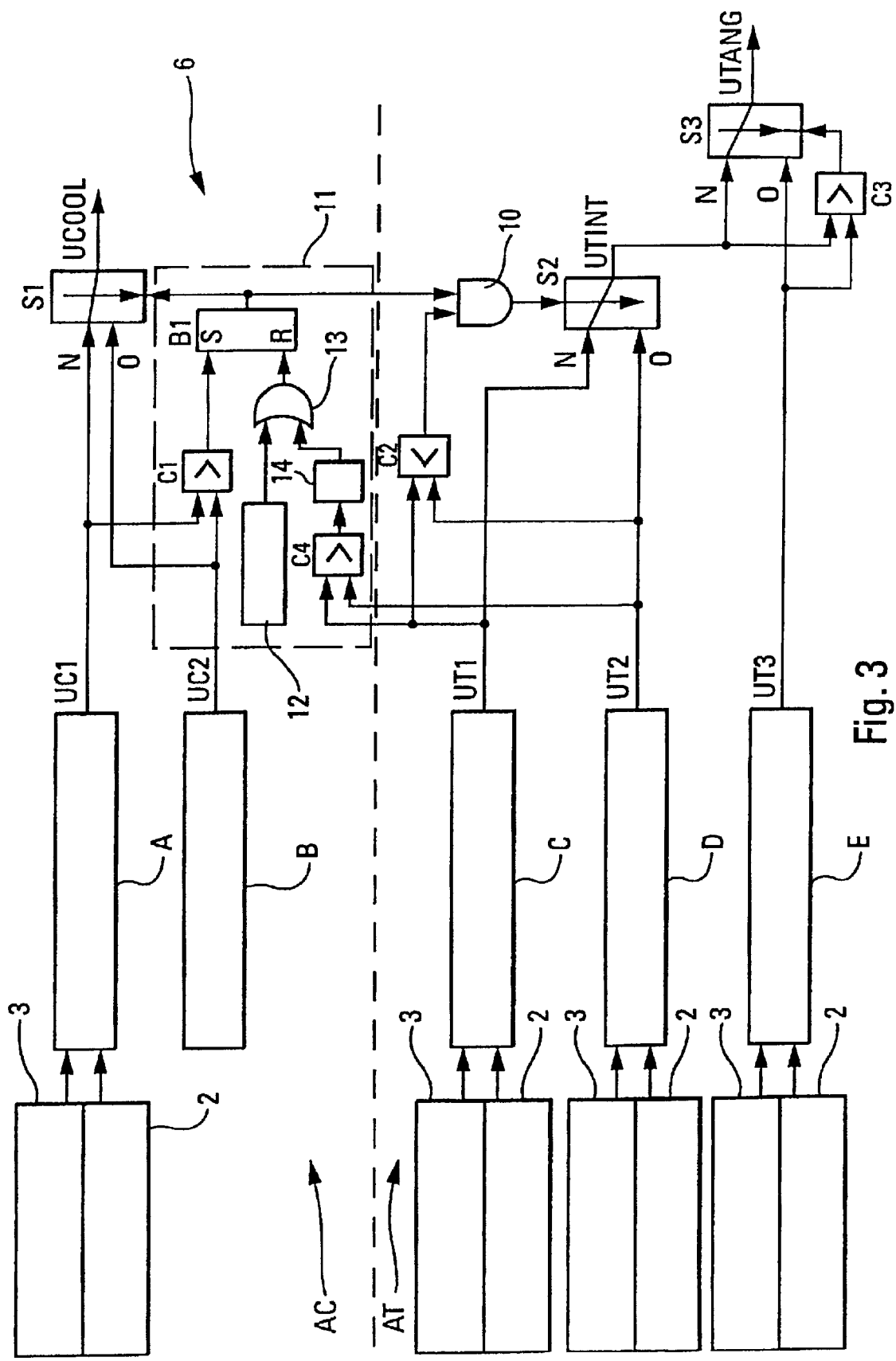
FIG. 3 is the schematic diagram of a flight control device which is improved with respect to that of FIG. 2.

The embodiment of FIG. 3 is similar to that of FIG. 2, but in this case, the automatic control device 6 moreover comprises latching means 11 for automatically latching the collective axis AC to the law B for maintaining the recommended power, when it is selected, as well as means 11 for automatically unlatching said latching means, as a function of at least one action of a pilot of the helicopter and/or of control commands which are determined for the pitching axis AT.

To latch the control of the collective axis AC to the law B for maintaining the recommended power, the means 11 comprise a toggle B1 of the known R/S type which is such that, when the input S is set, the output is at 1 until the input R switches to 1.

Thus, should the power be exceeded, if UC1 is greater than UC2, then UCOLL takes the value UC2. Since the pitching axis AT then takes control of the vertical objective, UC1 falls back to zero or turns around UC2, but the output of the toggle B1 remains latched to UC2, thereby avoiding oscillatory functioning at the power limit. The unlatching of the toggle B1 in order to return to standard functioning (law A) must intervene, according to the invention, under the following conditions:

logic conditions determined by an element 12, such as the disengagement by the pilot of the collective mode, the retaking of manual control by the pilot, a fault with the automatic control system 1 or the deliberate modifying of a preset by the pilot; and if UT1>UT2, as is verified by a comparator C4. In this case the toggle B1 must be unlatched, since the vertical objective law D becomes less constraining in terms of power than the law C with forward motion objective. We then again have UCOLL=UC1 and UTINT=UT1.

The input R of the toggle B1 therefore receives the information which emanates from an OR logic gate 13 which is linked to the element 12 and to the comparator C4. Moreover, to avoid untimely switchings due to signal noise for example, a standard filtering element 14 is mounted between the gate 13 and the comparator C4.

Figure 4:
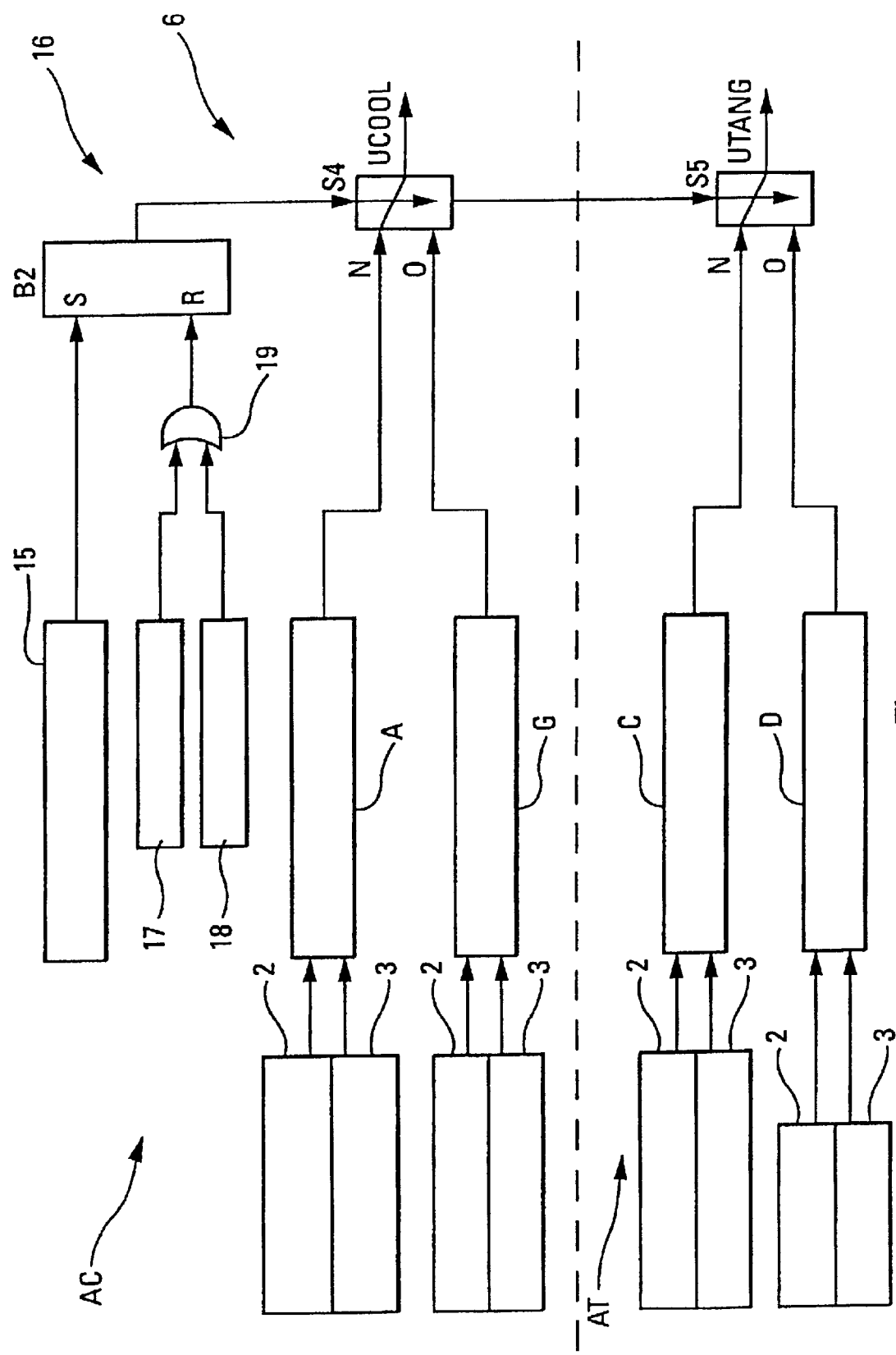
FIG. 4 diagrammatically shows an advantageous feature of the device in accordance with the present invention.

Additionally, in a particular embodiment represented diagrammatically in FIG. 4 and intended for avoiding excess consumption of fuel, the automatic control device 6 in accordance with the invention comprises means 15 for detecting stabilization of the flight case of the helicopter He. These means 15 detect stabilization of the flight case (level flight in this embodiment), when the airspeed lies within a predetermined domain of speeds for a predefined time, for example 30 seconds. During this time, the law A estimates the mean value of the pitch (during this predefined time) making it possible to comply with the vertical preset. In the case of stabilization throughout the aforesaid predetermined duration, toggling means 16 toggle the control of the collective axis AC from the vertical objective law A to a law G (having as state parameter and as preset value: the airspeed) which freezes (almost completely) the collective pitch of the main rotor RP at the mean value estimated during the aforesaid predetermined duration, so as to hold the level. At the same time, the control of the pitching axis AT toggles from the law C with forward motion objective to the law D with vertical objective. In this case, the airspeed is not therefore slaved, but is at a stabilized level, and the fluctuations remain imperceptible (balance between the variations in potential energy and in kinetic energy).

On the other hand, during a maneuver (turning for example), speed may be lost, this being contrary to the airspeed preset scheduled by the pilot. To counter this effect, correction means are introduced into the law G so as to correct the control command for the collective pitch, and to do so gently, that is to say with a response time which is greater than a predetermined time, so as to maintain an airspeed objective. These means therefore correct the collective pitch gently by invoking the collective axis AC weakly (limitation of excess consumption).

Said means 16 comprise a toggle B2 which makes it possible, moreover, to return to the selection representative of normal functioning, as a function:

of logic conditions which are determined by an element 17, such as a disengagement of mode, an intervention by the pilot on the controls or a change of preset; and too high and/or too prolonged a discrepancy between a measured state parameter and a corresponding preset, which discrepancy is determined by a calculation element 18.

The results of these means 17 and 18 are input into an OR logic gate 19 which is linked to the input R of the toggle B2, whose input S is linked to the means 15. This toggle B2 controls selectors S4 and S5 so as to select respectively between the laws A and G and the laws C and D.

The switching logic represented in FIG. 4 has two important advantages:

on the one hand, it complies with what a pilot does naturally and is therefore easy to interpret; and on the other hand, the collective axis AC now merely has to compensate for the fluctuations in the airspeed (in particular while turning). Their frequency and their amplitude being much lower than those of the fluctuations in the vertical plane, any excess consumptions of fuel are therefore greatly reduced.

What is claimed is:

1. A device for the automatic control of a helicopter comprising a main forward motion and lift rotor capable of being controlled at least along a collective axis and along a pitching axis, said device comprising:

at least one objective law in respect of the pitching axis, the aim of such an objective law being to bring at least one state parameter of the helicopter to an objective which represents a preset value of a state parameter, said objective law in respect of the pitching axis automatically determining for this purpose a control command for operating the tilting of the disk of said main rotor of the helicopter; and at least two objective laws in respect of the collective axis, each of these laws automatically determining a control command for operating the collective pitch of the blades of said main rotor, which device comprises:

at least two objective laws in respect of the pitching axis, which function simultaneously;

first selection means for automatically selecting the objective law, whose control command is used for the collective axis; and second selection means for automatically selecting, as a function of the selection made by said first selection means, the objective law whose control command is used for the pitching axis.

2. The device as claimed in claim 1, wherein it comprises at least one vertical objective law and one law for maintaining the recommended power for the collective axis, and at least one forward motion objective law and one vertical objective law for the pitching axis, wherein said first selection means automatically select the vertical objective law during normal functioning of the helicopter and the law for maintaining the recommended power when the power becomes insufficient to maintain the airspeed of the helicopter at a corresponding preset value, and wherein said second selection means automatically select:

the forward motion objective law, when the first selection means select the vertical objective law; and the vertical objective law when said first selection means select the law for maintaining the recommended power.

3. The device as claimed in claim 2, wherein it moreover comprises a law for maintaining the optimal upward speed for the pitching axis, and wherein said second selection means automatically select said law for maintaining the optimal upward speed when the power available is insufficient to maintain the airspeed above an optimal upward speed.

4. The device as claimed in claim 2, wherein it moreover comprises latching means for automatically latching the collective axis to a law for maintaining the recommended power, when it is selected.

5. The device as claimed in claim 4, wherein it moreover comprises means for automatically unlatching said latching means, as a function of at least one action of a pilot of the helicopter or of control commands which are determined for the pitching axis.

6. The device as claimed in claim 1, wherein it comprises at least one vertical objective law and one stabilization law for the collective axis, at least one forward motion objective law and one vertical objective law for the pitching axis, and means for detecting stabilization of the case of flight of the helicopter, and wherein said first selection means automatically select in respect of the collective axis the vertical objective law, during normal functioning of the helicopter, and when said detection means detect stabilization of the case of flight, said stabilization law which determines a control command for maintaining the collective pitch of the blades of the main rotor at a mean value, and wherein said second selection means automatically select:

the forward motion objective law, when the first selection means select the vertical objective law; and the vertical objective law, when said first selection means select the stabilization law.

7. The device as claimed in claim 6, wherein said stabilization law comprises means for correcting the control command of the collective pitch, with a response time which is greater than a predetermined time, so as to maintain an airspeed objective.

8. The device as claimed in claim 6, wherein it moreover comprises means for automatically returning as the case may be to the selection representative of normal functioning, as a function of at least one action of a pilot of the helicopter or of measured values.

9. A system for the automatic control of a helicopter, said system comprising:

a set of sensors for automatically determining the effective values of state parameters of the helicopter;

means of adjustment allowing an operator of the helicopter to choose preset values of state parameters;

a set of actuators which act on control axes of the helicopter, according to control commands; and an automatic control device which automatically determines control commands for said actuators, as a function of the state parameters and of the preset values, received respectively from said sensors and from said means of adjustment, wherein said automatic control device (6) is of the type specified under claim 1.

* * * * *